United States Patent [19]

Redaelli

[11] Patent Number: 5,125,216
[45] Date of Patent: Jun. 30, 1992

[54] VARIABLE SPEED HOT WELD PLASTIC FILM PACKAGING MACHINE

[75] Inventor: Marco Redaelli, Cassina De' Pecchi, Italy

[73] Assignee: Eurosicma S.r.l., Italy

[21] Appl. No.: 700,433

[22] Filed: May 15, 1991

[30] Foreign Application Priority Data

Jun. 7, 1990 [IT] Italy .............. 20576 A/90

[51] Int. Cl.⁵ .............................................. B65B 9/06
[52] U.S. Cl. ......................................... 53/550; 53/52; 156/358
[58] Field of Search .............. 493/208; 156/358; 53/52, 75, 77, 450, 550, 551

[56] References Cited

U.S. PATENT DOCUMENTS

| | | | |
|---|---|---|---|
| 3,472,158 | 10/1969 | Shields | 156/60 X |
| 3,743,562 | 7/1973 | Phipps | 156/358 X |
| 3,826,701 | 7/1974 | Miller | 156/358 X |
| 3,925,139 | 12/1975 | Simmons | 53/75 X |
| 3,958,390 | 5/1976 | Pringle, Jr. et al. | 53/450 X |
| 4,049,485 | 9/1977 | Iversen | 156/358 X |
| 4,313,778 | 2/1982 | Mims | 156/358 |
| 4,525,977 | 7/1985 | Matt | 53/550 X |
| 4,713,047 | 12/1987 | Klinkel | 156/358 X |
| 4,955,176 | 9/1990 | Seko et al. | 53/550 X |

*Primary Examiner*—Robert L. Spruill
*Assistant Examiner*—Daniel B. Moon
*Attorney, Agent, or Firm*—Shlesinger, Fitzsimmons & Shlesinger

[57] ABSTRACT

A packaging machine comprises a strip feeder (13) and tube former (14) for heat-welding plastic film strip into a tube. First welding apparatus (15) weld between them the side edges of the strip while a feed line (11) inputs into the tube thus formed products (12) that are to be packaged. Second weld apparatus (16) welds transversely of the tube at intervals to isolate each product in a section of the tube, thus realizing the packaging. Characteristically the first (15) and second (16) welding apparatus are pressed against the strip parts to be welded by an actuator (33, 34, 36, 37, 44, 43) controlled by a control device (46) to exert a pressure which is a function of the speed of travel of the strip.

10 Claims, 1 Drawing Sheet

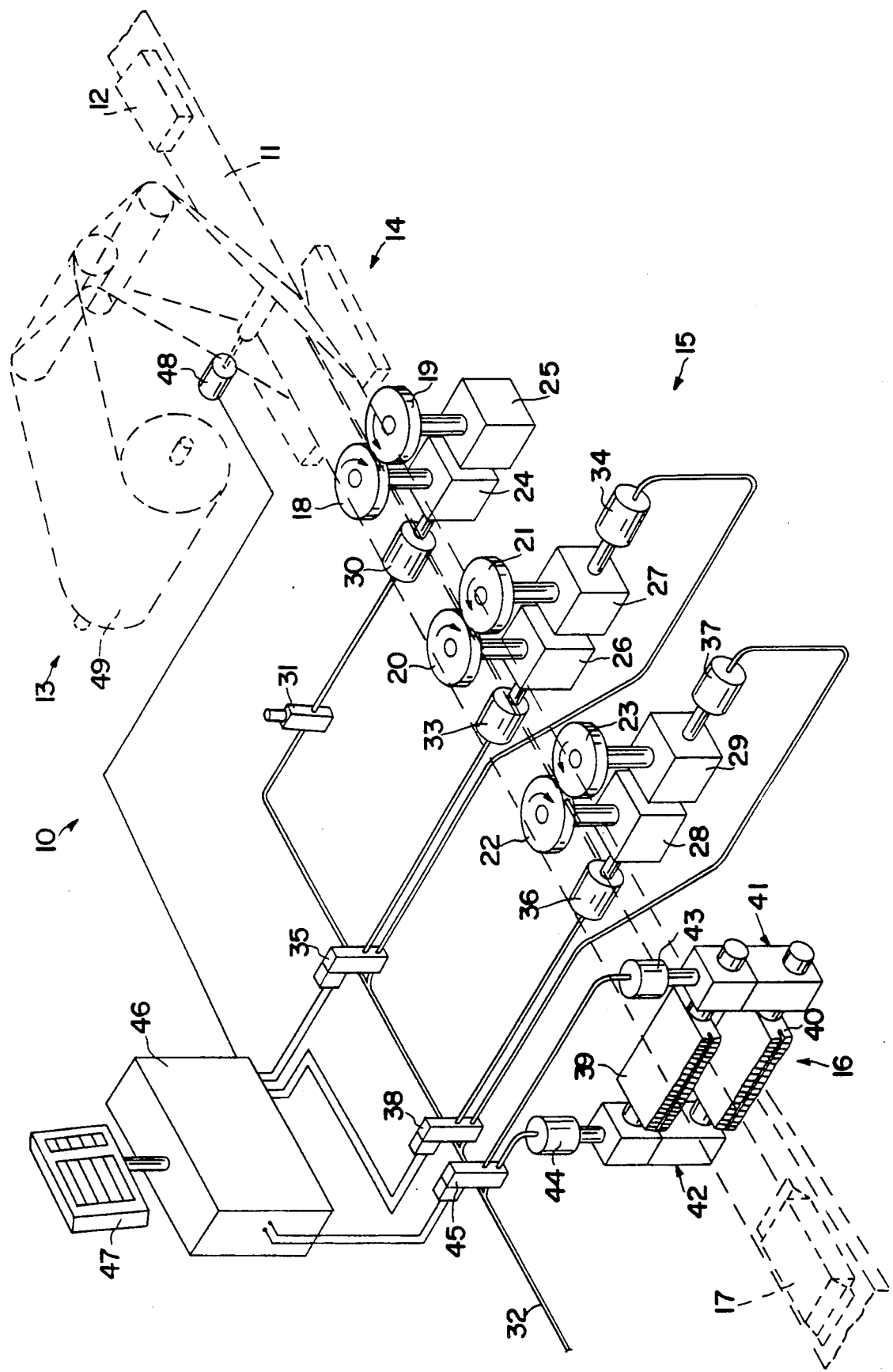

VARIABLE SPEED HOT WELD PLASTIC FILM PACKAGING MACHINE

BACKGROUND OF THE INVENTION

In the field of packaging machines problems due to the need for continuous changes of the speed of the plastic film subjected to welding are known. Said speed changes are due to the unavoidable irregularities of supply to the machine of products to be packaged, irregularities which require acceleration and slowing of the plastic film to avoid production of empty packages or with the surface printing off center.

The biggest problem is due to the fact that the films of heat-welding material unfortunately have a limited field of weldability depending on their speed of travel and the temperature of the heated welding elements. Given the frequency with which the speed changes, and the thermal inertia of the heating elements, it is not possible to change quickly enough the temperature of said welding elements and hence it happens that excessive slowing of the film causes its complete melting and burning while excessive speed causes defective welding or lack of welding.

In automated production lines where the range of strip speeds is not guaranteed inside the limits of weldability of the heat-welding materials it is therefore necessary to use cold welding film, which has much higher cost than normal heat-welding film.

Moreover, even in the case of systems with speeds usually held within the limits allowing the use of heat-welding materials, it happens occasionally that the system, for various and unforeseeable reasons, must suddenly slow down more than normally, which causes burning of the film and production of a certain number of defective packages for the entire duration of the slow-down.

SUMMARY OF THE INVENTION

The general object of the present invention is to overcome the above-mentioned drawbacks by supplying a packaging machine with welding of heat-welding plastic film which would allow severe fluctuations in the speed of the film without producing welding defects.

In view of said object it was thought to provide a packaging machine of the type comprising supply means for a heat-welding plastic film strip with forming means folding the side edges of the strip to bring them to a mating position, longitudinal welding means welding said edges together to give the strip a tube-like form in which products are adopted to be packaged, there being provided transverse welding means welding the tube transversely at intervals to isolate each product in a section of said tube and characterized in that said longitudinal and transverse welding means comprise pressing elements moved in a mutual engagement by actuator means, means sensitive to the strip speed causing said actuators to move said pressing elements on the surface to be welded with force increasing as speed increases.

DETAILED DESCRIPTION

To further clarify the explanation of the innovative principles of the present invention and its advantages as compared with the known art there is described below with the aid of the single annexed drawing a possible embodiment as an example applying said principles.

With reference to the FIGURE there is shown schematically a packaging machine in accordance with the present invention. Said machine is indicated generally by reference number 10 and comprises means 13 of supply of a heat-welding plastic film comprising a spool 49 from which the heat-welding film, optionally printed with writing or anything else which must appear on the packages, is fed to the machine through various idling rollers to reach a former 14 which folds it to give it a tubular form with the two side edges of the film mating below along a vertical plane longitudinal with the direction of running of said film. A line 11, e.g. consisting of a conveyor belt, for supply of products 12 to be packaged inputs said products into the mouth of the tube formed from the film. Simultaneously longitudinal welding means 15 weld the mating edges of the film and transverse welding means 16 weld and divide the tube around the products so as to form at the outlet of the machine the individual packages 17. The above described parts for transport of the products and unrolling, synchronization and folding of the plastic film being of the known art and hence easy to imagine by those skilled in the art, it is not considered necessary to explain them in greater detail.

In accordance with the innovative principles claimed here the longitudinal welding means 15 comprise a first pair of counter-rotating pressing rollers 18, 19, a second pair of counter-rotating pressing rollers 20, 21 and a third pair of counter-rotating pressing rollers 22 and 23. Said pressing rollers 18, 19, 20, 21, 22 and 23 are rotated by means of respective ratiomotors 24, 25, 26, 27, 28 and 29. Each pair of counter-rotating rollers has facing side edges between which run the mating side edges of the plastic film to be welded.

The first pair of rollers 18 and 19 is made up of cold rollers for bringing together the edges to be welded. One of the two rollers is connected to a compressed air piston 30 thrusting against the action of a spring (not shown) which allows regulation of the pressure exerted by the rollers on the two sides of the edges to be welded by operation of a manual valve 31 for regulation of the pressure of a control fluid arriving from a source duct 32. The rollers of the second and third pairs are electrically heated for hot welding of the material.

Each of the rollers 20 and 21 has a compressed air piston 33 and 34 respectively for thrust (against the action of a spring, not shown) against each other. A proportional valve 35 controlled electrically sends symmetrically to the pistons 33 and 34 the compressed air arriving from the duct 32 so as to exert a thrust of the rollers 20 and 21 on the two sides of the edges to be welded.

In like manner the rollers 22 and 23 each have compressed air pistons 36 and 37 respectively for thrust (against the action of a spring, not shown) against each other. A proportional valve 38 controlled electrically sends symmetrically to the pistons 36 and 37 the pressurized fluid arriving from the duct 32 so as to exert a thrust of the rollers 22 and 23 on the two sides of the edges to be welded.

The means of transverse welding 16 comprise two heated pressing elements 39 and 40 counter-rotating around horizontal axes by means of ratiomotor and side support units 41 and 42. The upper heated element 39 approaches the lower one 40 by the thrust against the action of a spring (not shown) of vertical side pistons 43 and 44 controlled by a proportional valve 45 controlled electrically and which sends thereto the pressurized fluid in the duct 32.

The proportional valves 35, 38 and 45 are connected electrically to an electronic control device 46 which controls, as will be clarified below, the opening of the valves on the basis of preset parameters and the running speed of the film as measured by a sensor 48, e.g. a speedometer dynamo.

The device 46 can be for example a microprocessor control device of the known art easy to imagine by those skilled in the art especially after the following description of the operation of the machine.

Advantageously said device supervises and controls the various functions of the machine as for example the running of the film, its synchronization with the arrival of the products, etc. and has a keyboard 47 for input of the data necessary for operation of the machine. Upon starting of the machine the pressing rollers 18 and 19 must be thrust against each other by manual regulation of the valve 31 after having positioned the film in such a manner that at the head end the two edges are between the rollers.

The valve 31 must be adjusted to supply a pressure of the rollers 18 and 19 on the film sufficient to bring together appropriately the edges and depending essentially on the characteristics of the material to be welded.

Then the parameters corresponding to the characteristics of the film can be set on the keyboard 47 and the machine can be started by giving the command to the control device, which heats the transverse and longitudinal welding elements to a temperature predetermined for the type of material of the film and the film begins to run synchronously with the arrival of the products 12. Simultaneously the device 46 calculates the pressure of the second and third pairs of rollers and the transverse welding elements depending on the temporary speed of the film and the parameters predetermined with reference to its characteristics, necessary to obtain the best weld. For example, the pressure of the welding means on the film, depending on the strip speed, can be a constant (null or near zero change) until reaching a minimum speed of the operational system, can then increase linearly up to a maximum pressure at which the pressure becomes constant. The minimum speed at which the rollers begin to exert pressure, the slope of the linear growth and the maximum pressure can be set on the keyboard for the type of heat-welding plastic film used in such a manner as to remain always in its range of weldability for all the operating conditions of the system.

Although the invention has been described for a specific embodiment it is evident that many alternatives and variations will be apparent to those skilled in the art in light of the foregoing description. Accordingly, the invention is intended to embrace all of the alternatives and variations that fall within the spirit and scope of the invention.

For example, although regulation of the pressure of the first pair of rollers 18 and 19 is described as manual and to be done only at the beginning, it is possible to automate it or assist it by replacing the manual valve 31 with an electrically controlled valve connected to the control device 46, similarly to the other pairs of rollers, optionally providing a symmetrical thrust on both the cold rollers 18, 19. In addition the number of welding rollers can of course be different from that shown. Finally, the drive pistons can be other than the compressed air type, even hydraulic, or actuator means controlled by an electric device to supply a linear thrust movement, hence for example even electric actuators as may easily be imagined by those skilled in the art.

I claim:

1. Packaging machine of the type comprising, feed means for feeding a strip of heat-welding plastic film along a predetermined path, forming means for folding the side edges of the strip to bring said edges into a mating, overlapping position, longitudinal welding means extending longitudinally of said path for welding said edges together to form the strip into a tube in which products are to be packaged, transverse welding means extending transversely of said path for intermittently welding the tube transversely thereof at intervals therealong thereby to isolate each of said products in a different section of said tube, and characterized in that said longitudinal and transverse welding means comprise opposed pressing elements located at opposite sides, respectively, of said strip, actuator means for moving said opposed pressing elements into engagement with registering portions of the strip that are to be welded together, and means responsive to the feeding speed of said strip to cause said actuator means to move said pressing elements against said registering portions of said strip with a force increasing with the increase of said speed.

2. Machine in accordance with claim 1 characterized in that said force exerted by said pressing elements increases essentially linearly with the speed of the strip, at least in a continuous range of said speed.

3. Machine in accordance with claim 1 characterized in that the pressing elements of said longitudinal welding means comprises a plurality of pairs of counter-rotating heating rollers, the rollers of each pair having confronting side edges between which run the mating, overlapping edges of the strip to be welded, said actuator means exerting said force by thrusting said rollers of each pair toward each other.

4. Machine in accordance with claim 1 characterized in that the pressing elements of said transverse welding means comprise two superposed heating elements mounted for counter rotating motion around spaced, horizontal axes, and having thereon transverse welding surfaces engageable at intervals with said tube running therebetween said actuator means exerting said force by thrusting said transverse welding surfaces toward each other.

5. Machine in accordance with claim 3 characterized in that said actuator means for said counter-rotating rollers of each pair thereof comprise two pistons controlled by a proportional valve controlled in turn electrically by said speed responsive means, said proportional valve supplying to the pistons of each pair of rollers a pressurized fluid arriving from a source thereof.

6. Machine in accordance with claim 4 characterized in that said actuator means for said two heating elements comprise two pistons controlled by a proportional valve controlled in turn electrically by said speed responsive means, said proportional valve supplying to said pistons a pressurized fluid arriving from a source thereof.

7. Machine in accordance with claim 1 characterized in that prewelding means is mounted on said machine in advance of said longitudinal welding means for engaging and pressing together the edges of said strip against each other.

8. Machine in accordance with claim 7 characterized in that said prewelding means for pressing said edges comprise counter-rotating rollers having confronting side edges thrust against each other and between which side edges run the mating edges of the strip.

9. Machine in accordance with claim 8 characterized in that said counter-rotating rollers are thrust against each other by at least one piston controlled by a valve for regulation of the pressure of a control fluid arriving from a source thereof.

10. Machine in accordance with claim 1 characterized in that the speed responsive means comprises a speedometer sensor connected to a microprocessor control device operative to emit signals for controlling the actuator means.

* * * * *